US009304889B1

(12) United States Patent
Chen et al.

(10) Patent No.: US 9,304,889 B1
(45) Date of Patent: Apr. 5, 2016

(54) SUSPENDING DATA REPLICATION

(71) Applicant: EMC Corporation, Hopkinton, MA (US)

(72) Inventors: Xiangping Chen, Sherborn, MA (US); David Meiri, Cambridge, MA (US)

(73) Assignee: EMC Corporation, Hopkinton, MA (US)

( * ) Notice: Subject to any disclaimer, the term of this patent is extended or adjusted under 35 U.S.C. 154(b) by 78 days.

(21) Appl. No.: 14/494,899

(22) Filed: Sep. 24, 2014

(51) Int. Cl.
*G06F 12/00* (2006.01)
*G06F 13/00* (2006.01)
*G06F 11/34* (2006.01)

(52) U.S. Cl.
CPC .................. *G06F 11/3452* (2013.01)

(58) Field of Classification Search
None
See application file for complete search history.

(56) References Cited

U.S. PATENT DOCUMENTS

| | | | |
|---|---|---|---|
| 5,537,534 | A | 7/1996 | Voigt et al. |
| 5,860,137 | A | 1/1999 | Raz et al. |
| 5,999,842 | A * | 12/1999 | Harrison ............... A61B 5/4312 600/474 |
| 6,643,654 | B1 | 11/2003 | Patel et al. |
| 6,870,929 | B1 | 3/2005 | Greene |
| 7,251,663 | B1 | 7/2007 | Smith |
| 7,552,125 | B1 | 6/2009 | Evans |
| 7,814,218 | B1 | 10/2010 | Knee et al. |
| 7,827,136 | B1 | 11/2010 | Wang et al. |
| 7,908,436 | B1 | 3/2011 | Srinivasan et al. |
| 8,200,923 | B1 | 6/2012 | Healey et al. |
| 8,478,951 | B1 | 7/2013 | Healey et al. |
| 9,037,822 | B1 | 5/2015 | Meiri et al. |
| 9,208,162 | B1 | 12/2015 | Hallak et al. |
| 2002/0056031 | A1 * | 5/2002 | Skiba ..................... G06F 3/0608 711/162 |
| 2005/0125626 | A1 | 6/2005 | Todd |
| 2005/0144416 | A1 | 6/2005 | Lin |
| 2005/0171937 | A1 | 8/2005 | Hughes et al. |

(Continued)

FOREIGN PATENT DOCUMENTS

| | | |
|---|---|---|
| EP | 1804157 | 7/2007 |
| WO | WO 2010/019596 | 2/2010 |

(Continued)

OTHER PUBLICATIONS

Response to Office Action dated May 11, 2015 corresponding to U.S. Appl. No. 14/037,626; Response filed on Jul. 20, 2015; 10 Pages.

(Continued)

*Primary Examiner* — Sean D Rossiter
(74) *Attorney, Agent, or Firm* — Daly, Crowley, Mofford & Durkee, LLP

(57) ABSTRACT

In one aspect, a method includes monitoring a replication process, predicting performance based on the monitoring, receiving a suspend notification and determining whether to suspend the replication process or wait to suspend the replication process based on the performance predicted. In another aspect, an apparatus includes electronic hardware circuitry configured to monitor a replication process, predict performance based on the monitoring, receive a suspend notification and determine whether to suspend the replication process or wait to suspend the replication process based on the performance predicted. In a further aspect, an apparatus includes electronic hardware circuitry configured to: monitor a replication process, predict performance based on the monitoring, receive a suspend notification and determine whether to suspend the replication process or wait to suspend the replication process based on the performance predicted.

19 Claims, 11 Drawing Sheets

(56) References Cited

U.S. PATENT DOCUMENTS

| | | | |
|---|---|---|---|
| 2005/0193084 | A1 | 9/2005 | Todd et al. |
| 2006/0031653 | A1 | 2/2006 | Todd et al. |
| 2006/0123212 | A1* | 6/2006 | Yagawa ............. G06F 11/2058 711/162 |
| 2007/0208788 | A1 | 9/2007 | Chakravarty et al. |
| 2008/0178050 | A1* | 7/2008 | Kern ................. G06F 11/1666 714/54 |
| 2009/0006745 | A1* | 1/2009 | Cavallo ............. G06F 11/1471 711/114 |
| 2009/0030986 | A1 | 1/2009 | Bates |
| 2009/0222596 | A1 | 9/2009 | Flynn et al. |
| 2010/0042790 | A1 | 2/2010 | Mondal et al. |
| 2010/0180145 | A1 | 7/2010 | Chu |
| 2010/0199066 | A1 | 8/2010 | Artan et al. |
| 2010/0205330 | A1 | 8/2010 | Noborikawa et al. |
| 2010/0257149 | A1 | 10/2010 | Cognigni et al. |
| 2011/0083026 | A1* | 4/2011 | Mikami ............... G06F 1/3203 713/323 |
| 2011/0099342 | A1 | 4/2011 | Ozdemir |
| 2011/0225122 | A1* | 9/2011 | Denuit ............. G06F 17/30584 707/634 |
| 2012/0124282 | A1 | 5/2012 | Frank et al. |
| 2012/0290798 | A1 | 11/2012 | Huang et al. |
| 2012/0304024 | A1* | 11/2012 | Rohleder ................ G06F 9/28 714/49 |
| 2013/0031077 | A1 | 1/2013 | Liu et al. |
| 2013/0138607 | A1 | 5/2013 | Bashyam et al. |
| 2013/0246724 | A1* | 9/2013 | Furuya ................. G06F 3/0655 711/162 |
| 2013/0265883 | A1 | 10/2013 | Henry et al. |
| 2014/0136759 | A1 | 5/2014 | Sprouse et al. |
| 2015/0006910 | A1 | 1/2015 | Shapiro |
| 2015/0088823 | A1* | 3/2015 | Chen ................. G06F 17/30578 707/626 |

FOREIGN PATENT DOCUMENTS

| | | |
|---|---|---|
| WO | WO 2010/040078 | 4/2010 |
| WO | WO 2012/066528 | 5/2012 |

OTHER PUBLICATIONS

Office Action dated Jul. 22, 2015 corresponding to U.S. Appl. No. 14/034,981; 28 Pages.
Nguyen et al., "B+ Hash Tree: Optimizing Query Execution Times for on-Disk Semantic Wed Data Structures;" Proceedings of the 6th International Workshop on Scalable Semantic Web Knowledge Base Systems; Shanghai, China, Nov. 8, 2010; 16 Pages.
Halevi et al.; "Synchronization of Volumes;" U.S. Appl. No. 14/034,981, filed Sep. 24, 2013; 46 pages.
Ben-Moshe et al.; "Hash-Based Replication;" U.S. Appl. No. 14/037,577, filed Sep. 26, 2013; 43 Pages.
Meiri et al.; "Hierarchical Volume Tree;" U.S. Appl. No. 14/037,511, filed Sep. 26, 2013; 33 pages.
Meiri et al.; "Data Reduction Techniques in a Flash-Based Key/Value Cluster Storage;" U.S. Appl. No. 14/230,405, filed Mar. 31, 2014; 46 pages.
Meiri; "Encrypting Data in a Flash-Based Contents-Addressable Block Device;" U.S. Appl. No. 14/230,414, filed Mar. 31, 2014; 41 pages.
Halevi et al.; "Hash-Based Replication Using Short Hash Handle and Identity Bit;" U.S. Appl. No. 14/317,449, filed Jun. 27, 2014; 45 pages.
Meiri et al.; "Adjusting Consistency Groups During Asynchronous Replication;" U.S. Appl. No. 14/494,895, filed Sep. 24, 2014; 45 pages.
U.S. Appl. No. 12/945,915.
U.S. Appl. No. 12/945,915
PCT Advance E-Mail Transmittal of IPR dated May 30, 2013 corresponding to Pat. App. No. PCT/IL2011/000692; 1 Page.
PCT International Preliminary Report dated May 30, 2013 corresponding to Pat. App. No. PCT/IL2011/000692; 1 Page.
PCT Written Opinion of the ISA dated May 30, 2013 corresponding to Pat. App. No. PCT/IL2011/000692; 5 Pages.
PCT Notification of Transmittal of ISR and Written Opinion dated Dec. 1, 2011 corresponding to Pat. App. No. PCT/IL2011/000692; 1 Page.
PCT International Search Report dated Dec. 1, 2011 corresponding to Pat. App. No. PCT/IL2011/000692; 4 Pages.
PCT Written Opinion of the ISA dated Dec. 1, 2011 corresponding to Pat. App. No. PCT/IL2011/000692; 5 Pages.
Office Action dated Dec. 1, 2015 corresponding to U.S. Appl. No. 14/230,405; 17 Pages.
U.S. Appl. No. 15/001,784, filed Jan. 20, 2016, Meiri et al.
U.S. Appl. No. 15/001,789, filed Jan. 20, 2016, Meiri et al.
Response to Office Action dated Jul. 22, 2015 corresponding to U.S. Appl. No. 14/034,981; Response filed on Dec. 22, 2015; 14 Pages.
Response to Office Action dated Sep. 1, 2015 corresponding to U.S. Appl. No. 14/230,414; Response filed on Jan. 14, 2016; 10 Pages.
Renen Hallak, et al.; "Generating a Short Hash Handle," U.S. Appl. No. 14/037,626, filed Sep. 26, 2013 42 pages.
Restriction Requirement dated Sep. 24, 2015 corresponding to U.S. Appl. No. 14/230,405; 8 Pages.
Response to Restriction Requirement dated Sep. 24, 2015 corresponding to U.S. Appl. No. 14/230,405; Response filed on Oct. 6, 2015; 1 Page.
Notice of Allowance dated Oct. 26, 2015 corresponding to U.S. Appl. No. 14/037,626; 12 Pages.
Notice of Allowance dated Apr. 13, 2015 corresponding to U.S. Appl. No. 14/037,511; 11 Pages.
Non-Final Office Action dated May 11, 2015 corresponding to U.S. Appl. No. 14/037,626; 13 Pages.
Office Action dated Sep. 1, 2015 corresponding to U.S. Appl. No. 14/230,414; 13 Pages,

* cited by examiner

SUSPENDING DATA REPLICATION

BACKGROUND

Storage systems in general, and block based storage systems specifically, are a key element in modern data centers and computing infrastructure. These systems are designed to store and retrieve large amounts of data, by providing data block address and data block content—for storing a block of data—and by providing a data block address for retrieval of the data block content that is stored at the specified address.

Storage solutions are typically partitioned into categories based on a use case and application within a computing infrastructure, and a key distinction exists between primary storage solutions and archiving storage solutions. Primary storage is typically used as the main storage pool for computing applications during application run-time. As such, the performance of primary storage systems is very often a key challenge and a major potential bottleneck in overall application performance, since storage and retrieval of data consumes time and delays the completion of application processing. Storage systems designed for archiving applications are much less sensitive to performance constraints, as they are not part of the run-time application processing.

In general computer systems grow over their lifetime and the data under management tends to grow over the system lifetime. Growth can be exponential, and in both primary and archiving storage systems, exponential capacity growth typical in modern computing environment presents a major challenge as it results in increased cost, space, and power consumption of the storage systems required to support ever increasing amounts of information.

Existing storage solutions, and especially primary storage solutions, rely on address-based mapping of data, as well as address-based functionality of the storage system's internal algorithms. This is only natural since the computing applications always rely on address-based mapping and identification of data they store and retrieve. However, a completely different scheme in which data, internally within the storage system, is mapped and managed based on its content instead of its address has many substantial advantages. For example, it improves storage capacity efficiency since any duplicate block data will only occupy actual capacity of a single instance of that block. As another example, it improves performance since duplicate block writes do not need to be executed internally in the storage system. Existing storage systems, either primary storage systems or archiving storage systems are incapable of supporting the combination of content based storage—with its numerous advantages—and ultra-high performance. This is a result of the fact that the implementation of content based storage scheme faces several challenges:

(a) intensive computational load which is not easily distributable or breakable into smaller tasks, (b) an inherent need to break large blocks into smaller block sizes in order to achieve content addressing at fine granularity. This block fragmentation dramatically degrades the performance of existing storage solutions, (c) inability to maintain sequential location of data blocks within the storage systems, since mapping is not address based any more, and such inability causes dramatic performance degradation with traditional spinning disk systems, (d) the algorithmic and architectural difficulty in distributing the tasks associated with content based mapping over a large number of processing and storage elements while maintaining single content-addressing space over the full capacity range of the storage system.

A number of issues arise with respect to such devices, and it is necessary to consider such issues as performance, lifetime and resilience to failure of individual devices, overall speed of response and the like.

Such devices may be used in highly demanding circumstances where failure to process data correctly can be extremely serious, or where large scales are involved, and where the system has to be able to cope with sudden surges in demand.

SUMMARY

In one aspect, a method includes monitoring a replication process, predicting performance based on the monitoring, receiving a suspend notification and determining whether to suspend the replication process or wait to suspend the replication process based on the performance predicted. In another aspect, an apparatus includes electronic hardware circuitry configured to monitor a replication process, predict performance based on the monitoring, receive a suspend notification and determine whether to suspend the replication process or wait to suspend the replication process based on the performance predicted. In a further aspect, an apparatus includes electronic hardware circuitry configured to: monitor a replication process, predict performance based on the monitoring, receive a suspend notification and determine whether to suspend the replication process or wait to suspend the replication process based on the performance predicted.

DETAILED DESCRIPTION

Figure 1:
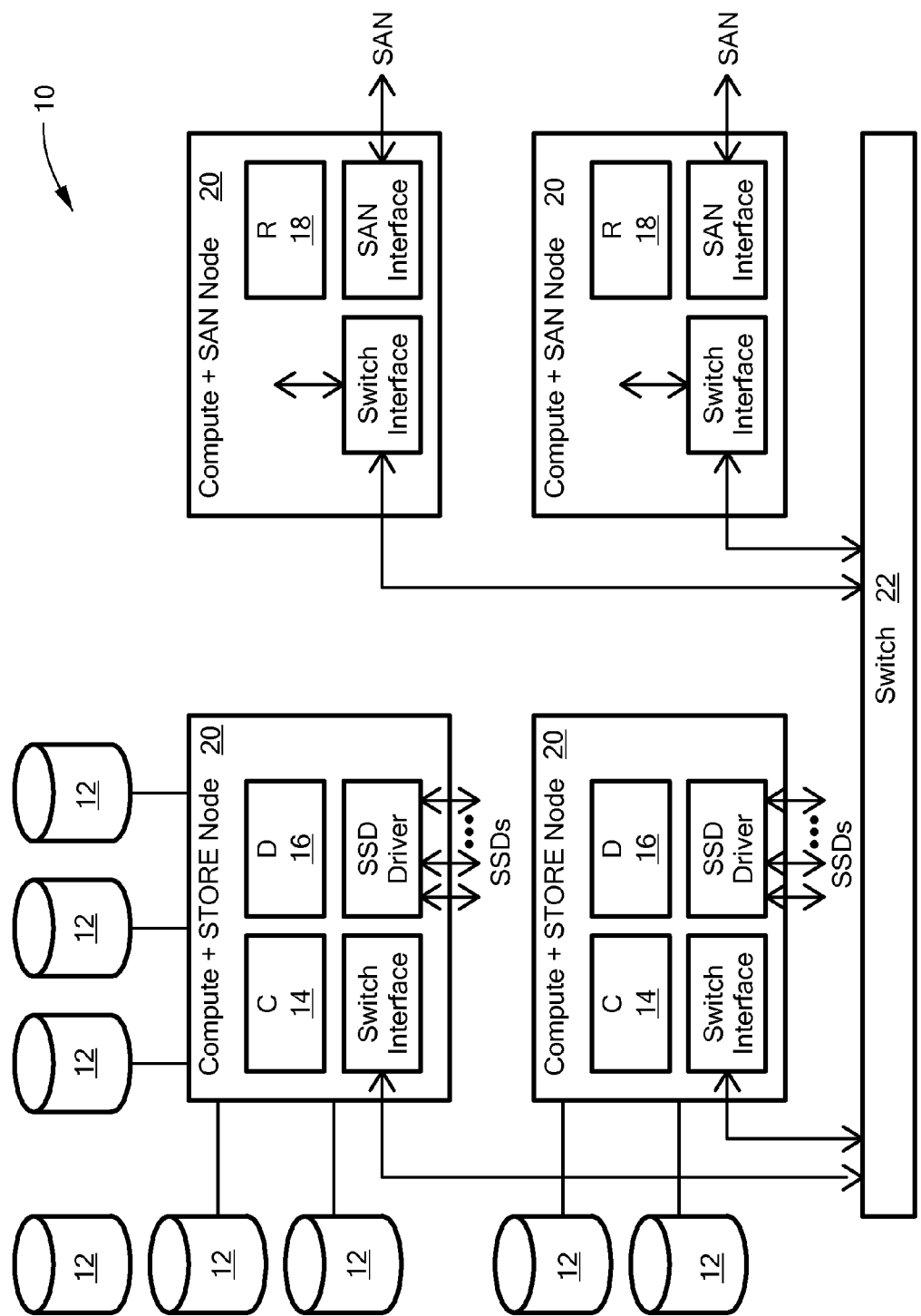
FIG. 1 is a simplified diagram schematically illustrating a system for data storage, having separate control and data planes.

Asynchronous snapshot based remote replication provides data protection against site disaster with minimal impact to host I/O performance. Asynchronous snapshot based remote replication generates snapshots, calculates differences (deltas) between the snapshots, periodically transfers the differenced to remote sites and reconstructs data content. Once a user sets up a replication relationship, the system automatically schedules the data transfer without user intervention. In a distributed system, the system further divides the work of calculating and sending the differences (deltas) among worker threads and clustered nodes. At times, there is a need to suspend the replication data transfer activity. One such example is in real or simulated disaster recovery scenario, where a reliable way is needed to stop ongoing replication activity while preserving data transfer already been done. Other cases that may trigger suspend/abort replication data transfer includes: network reconfiguration, storage array software upgrade and so forth. Since the suspend event/command could come at any state of replication, it is desirable that the system builds have the capability to handle suspend requests in an optimum cost efficient and performant manner. Additionally, it is desirable to distinguish between cases where it is cheaper to abort replication than to wait for a cycle to complete. Described herein ate techniques that determine when to suspend replication.

Before describing the specific techniques, FIGS. 1 to 9 describe components that may be used in an example replication system. However, one of ordinary skill in the art would recognize that any of the techniques described herein may be applied to numerous other replication systems to suspend replication.

In a Content Addressable Storage (CAS) array, data is stored in blocks, for example of 4 KB, where each block has a unique large hash signature, for example of 20 bytes, saved on Flash memory.

The examples described herein include a networked memory system. The networked memory system includes multiple memory storage units arranged for content addressable storage of data. The data is transferred to and from the storage units using separate data and control planes. Hashing is used for the content addressing, and the hashing produces evenly distributed results over the allowed input range. The hashing defines the physical addresses so that data storage makes even use of the system resources.

A relatively small granularity may be used, for example with a page size of 4 KB, although smaller or larger block sizes may be selected at the discretion of the skilled person. This enables the device to detach the incoming user access pattern from the internal access pattern. That is to say the incoming user access pattern may be larger than the 4 KB or other system-determined page size and may thus be converted to a plurality of write operations within the system, each one separately hashed and separately stored.

Content addressable data storage can be used to ensure that data appearing twice is stored at the same location. Hence unnecessary duplicate write operations can be identified and avoided. Such a feature may be included in the present system as data deduplication. As well as making the system more efficient overall, it also increases the lifetime of those storage units that are limited by the number of write/erase operations.

The separation of Control and Data may enable a substantially unlimited level of scalability, since control operations can be split over any number of processing elements, and data operations can be split over any number of data storage elements. This allows scalability in both capacity and performance, and may thus permit an operation to be effectively balanced between the different modules and nodes.

The separation may also help to speed the operation of the system. That is to say it may speed up Writes and Reads. Such may be due to:

(a) Parallel operation of certain Control and Data actions over multiple Nodes/Modules (b) Use of optimal internal communication/networking technologies per the type of operation (Control or Data), designed to minimize the latency (delay) and maximize the throughput of each type of operation.

Also, separation of control and data paths may allow each Control or Data information unit to travel within the system between Nodes or Modules in the optimal way, meaning only to where it is needed and if/when it is needed. The set of optimal where and when coordinates is not the same for control and data units, and hence the separation of paths ensures the optimization of such data and control movements, in a way which is not otherwise possible. The separation is important in keeping the workloads and internal communications at the minimum necessary, and may translate into increased optimization of performance.

De-duplication of data, meaning ensuring that the same data is not stored twice in different places, is an inherent effect of using Content-Based mapping of data to D-Modules and within D-Modules.

Scalability is inherent to the architecture. Nothing in the architecture limits the number of the different R, C, D, and H modules which are described further herein. Hence any number of such modules can be assembled. The more modules added, the higher the performance of the system becomes and the larger the capacity it can handle. Hence scalability of performance and capacity is achieved.

The principles and operation of an apparatus and method according to the present invention may be better understood with reference to the drawings and accompanying description.

Reference is now made to FIG. 1 which illustrates a system 10 for scalable block data storage and retrieval using content addressing. The system 10 includes data storage devices 12 on which the data blocks are stored. The storage devices 12 are networked to computing modules, there being several kinds of modules, including control modules 14 and data modules 16. The modules carry out content addressing for storage and retrieval, and the network defines separate paths or planes, control paths or a control plane which goes via the control modules 14 and data paths or a data plane which goes via the data modules 16.

The control modules 14 may control execution of read and write commands. The data modules 16 are connected to the storage devices and, under control of a respective control module, pass data to or from the storage devices. Both the C and D modules may retain extracts of the data stored in the storage device, and the extracts may be used for the content addressing. Typically the extracts may be computed by cryptographic hashing of the data, as will be discussed in greater detail below, and hash modules (FIG. 2) may specifically be provided for this purpose. That is to say the hash modules calculate hash values for data which is the subject of storage commands, and the hash values calculated may later be used for retrieval.

Routing modules 18 may terminate storage and retrieval operations and distribute command parts of any operations to control modules that are explicitly selected for the operation in such a way as to retain balanced usage within the system 10.

The routing modules may use hash values, calculated from data associated with the operations, to select the control module for the distribution. More particularly, selection of the control module may use hash values, but typically relies on the user address and not on the content (hash). The hash value is, however, typically used for selecting the Data (D) module, and for setting the physical location for data storage within a D module.

The storage devices may be solid state random access storage devices, as opposed to spinning disk devices; however disk devices may be used instead or in addition.

A deduplication feature may be provided. The routing modules and/or data modules may compare the extracts or hash values of write data with hash values of already stored data, and where a match is found, simply point to the matched data and avoid rewriting.

The modules are combined into nodes 20 on the network, and the nodes are connected over the network by a switch 22.

The use of content addressing with multiple data modules selected on the basis of the content hashing, and a finely-grained mapping of user addresses to Control Modules allow for a scalable distributed architecture.

A glossary is now given of terms used in the following description:

X-PAGE—A predetermined-size aligned chunk as the base unit for memory and disk operations. Throughout the present description the X-Page size is referred to as having 4 KB, however other smaller or larger values can be used as well and nothing in the design is limited to a specific value.

LUN or LOGICAL UNIT NUMBER is a common name in the industry for designating a volume of data, or a group of data blocks being named with the LUN. Each data block is referred to, by the external user of the storage system, according to its LUN, and its address within this LUN LOGICAL X-PAGE ADDRESS—Logical address of an X-Page. The address contains a LUN identifier as well as the offset of the X-Page within the LUN.

LOGICAL BLOCK—512 bytes (sector) aligned chunk, which is the SCSI base unit for disk operations.

LOGICAL BLOCK ADDRESS—Logical address of a Logical Block. The logical block address contains a LUN identifier as well as the offset of the logical block within the LUN.

SUB-LUN-Division of a LUN to smaller logical areas, to balance the load between C modules. Each such small logical area is called a sub-LUN.

SUB-LUN UNIT SIZE—The fixed size of a sub-LUN. X-Page Data-Specific sequence of user data values that resides in an X-Page. Each such X-Page Data is uniquely represented in the system by its hash digest.

D PRIMARY—The D module responsible for storing an X-Page's Data

D BACKUP—The D module responsible for storing a backup for an X-Page Data. The backup is stored in a non-volatile way (NVRAM or UPS protected).

Acronyms:
LXA—Logical X-Page Address.
LB—Logical Block.
LBA—Logical Block Address.
AUS—Atomic Unit Size.
SL—Sub-LUN.
SLUS—Sub-LUN Unit Size.
MBE—Management Back End.

The examples described herein to a block-level storage system, offering basic and advanced storage functionality. The design may be based on a distributed architecture, where computational, Storage Area Networking (SAN), and storage elements are distributed over multiple physical Nodes, with all such Nodes being inter-connected over an internal network through a switch device. The distributed architecture enables the scaling of the system's capabilities in multiple aspects, including overall storage capacity, performance characteristics in bandwidth and I/O operations per second (IOPS), computational resources, internal and external networking bandwidth, and other. While being based on a distributed architecture, the system presents, externally, a unified storage system entity with scalable capabilities.

The system's architecture and internal algorithms implementing the basic and advanced storage functions are optimized for improved utilization of the capabilities of random-access memory/storage media, as opposed to contrast with mechanical-magnetic spinning disk storage media. The optimizations are implemented in the design itself, and may, for example, include the ability to break incoming writes into smaller blocks and distribute the operation over different Nodes. Such an adaptation is particularly suitable for random access memory/storage media but is less suitable in a spinning-disk environment, as it would degrade performance to extremely low levels. The adaptation includes the content/hash based mapping of data distributes the data over different D Nodes in general and within D Nodes over different SSD devices. Again, such a scheme is more suitable for random access memory/storage media than for a spinning-disk media because such spread of data blocks would result in very poor performance in the spinning disk case. That is to say, the described elements of the present architecture are designed to work well with random access media, and achieve benefits in performance, scalability, and functionality such as inline deduplication. Such random-access memory media can be based on any or a combination of flash memory, DRAM, phase change memory, or other memory technology, whether persistent or non-persistent, and is typically characterized by random seek/access times and random read/write speeds substantially higher than those exhibited by spinning disk media. The system's internal data block mapping, the algorithms implementing advanced storage functions, and the algorithms for protecting data stored in the system are designed to provide storage performance and advanced storage functionality at substantially higher performance, speed, and flexibility than those available with alternative storage systems.

Data mapping within the system is designed not only to improve performance, but also to improve the life span and reliability of the electronic memory media, in cases where the memory technology used has limitations on write/erase cycles, as is the case with flash memory. Lifetime maximization may be achieved by avoiding unnecessary write operations as will be explained in greater detail below. For the purpose of further performance optimization, life span maximization, and cost optimization, the system may employ more than a single type of memory technology, including a mix of more than one Flash technology (e.g., single level cell—SLC flash and multilevel cell—MLC flash), and a mix of Flash and DRAM technologies. The data mapping optimizes performance and life span by taking advantage of the different access speeds and different write/erase cycle limitations of the various memory technologies.

The core method for mapping blocks of data internally within the system is based on Content Addressing, and is implemented through a distributed Content Addressable Storage (CAS) algorithm.

This scheme maps blocks of data internally according to their content, resulting in mapping of identical block to the same unique internal location. The distributed CAS algorithm allows for scaling of the CAS domain as overall system capacity grows, effectively utilizing and balancing the available computational and storage elements in order to improve overall system performance at any scale and with any number of computational and storage elements.

The system supports advanced In-line block level deduplication, which may improve performance and save capacity.

Elements of the system's functionality are: Write (store) data block at a specified user address; Trim data block at a specified user address; Read data block from a specified user address; and In-line block level deduplication.

The following features may be provided: (1) A distributed CAS based storage optimized for electronic random-access storage media; The optimization includes utilizing storage algorithms, mainly the content-based uniformly-distributed mapping of data, that inherently spread data in a random way across all storage devices. Such randomization of storage locations within the system while maintaining a very high level of performance is preferably achievable with storage media with a high random access speed; (2) A distributed storage architecture with separate control and data planes; Data mapping that maximizes write-endurance of storage media; System scalability; (3) System resiliency to fault and/or failure of any of its components; (4) Use of multi-technology media to maximize write-endurance of storage media; and (5) In-line deduplication in ultrahigh performance storage using electronic random-access storage media.

The examples described herein implement block storage in a distributed and scalable architecture, efficiently aggregating performance from a large number of ultra-fast storage media elements (SSDs or other), preferably with no performance bottlenecks, while providing in-line, highly granular block-level deduplication with no or little performance degradation.

One challenge is to avoid performance bottlenecks and allow performance scalability that is independent of user data access patterns.

The examples described herein may overcome the scalability challenge by providing data flow (Write, Read) that is distributed among an arbitrary and scalable number of physical and logical nodes. The distribution is implemented by (a) separating the control and data paths (the "C" and "D" modules), (b) maintaining optimal load balancing between all Data modules, based on the content of the blocks (through the CAS/hashing mechanisms), hence ensuring always balanced load sharing regardless of user access patterns, (c) maintaining optimal load balancing between all Control modules, based on the user address of the blocks at fine granularity, hence ensuring always balanced load sharing regardless of user access patterns, and (d) performing all internal data path operations using small granularity block size, hence detaching the incoming user access pattern from the internal access pattern, since the user pattern is generally larger than the block size.

A second challenge is to support inline, highly granular block level deduplication without degrading storage (read/write speed) performance. The result should be scalable in both capacity—which is deduplicated over the full capacity space—and performance.

The solution involves distributing computation-intensive tasks, such as calculating cryptographic hash values, among an arbitrary number of nodes. In addition, CAS metadata and its access may be distributed among an arbitrary number of nodes. Furthermore, data flow algorithms may partition read/write operations in an optimally-balanced way, over an arbitrary and scalable number of Nodes, while guaranteeing consistency and inline deduplication effect over the complete storage space.

In detaching the data from the incoming pattern, the R-Module breaks up any incoming block which is larger than the granularity size across sub-LUNs, sending the relevant parts to the appropriate C-Modules. Each C-module is pre-defined to handle a range or set of Sub-LUN logical addresses. The C-Module breaks up the block it receives for distribution to D-Modules, at a pre-determined granularity, which is the granularity for which a Hash is now calculated. Hence the end result is that a request to write a certain block (for example of size 64 KB) ends up being broken up into for example 16 internal writes, each write comprising a 4 KB block.

The specific numbers for granularity can be set based on various design tradeoffs, and the specific number used herein of 4 KB is merely an example. The broken down blocks are then distributed to the D modules in accordance with the corresponding hash values.

A further challenge is to address flash-based SSD write/erase cycle limitations, in which the devices have a lifetime dependent on the number of write/erase cycles.

The solution may involve Inline deduplication to avoid writing in all cases of duplicate data blocks. Secondly, content (hash) based mapping to different data modules and SSDs results in optimal wear-leveling, ensuring equal spread of write operations to all data modules and SSDs independently of the user data/address access patterns.

In the following a system is considered from a functional point of view. As described above with respect to FIG. 1, the system 10 is architected around four main functional Modules designated R (for Router), C (for Control), D (for Data), and H (for Hash). Being modular and scalable, any specific system configuration includes at least one of R, C, D, and H, but may include a multiplicity of any or all of these Modules.

Figure 2:
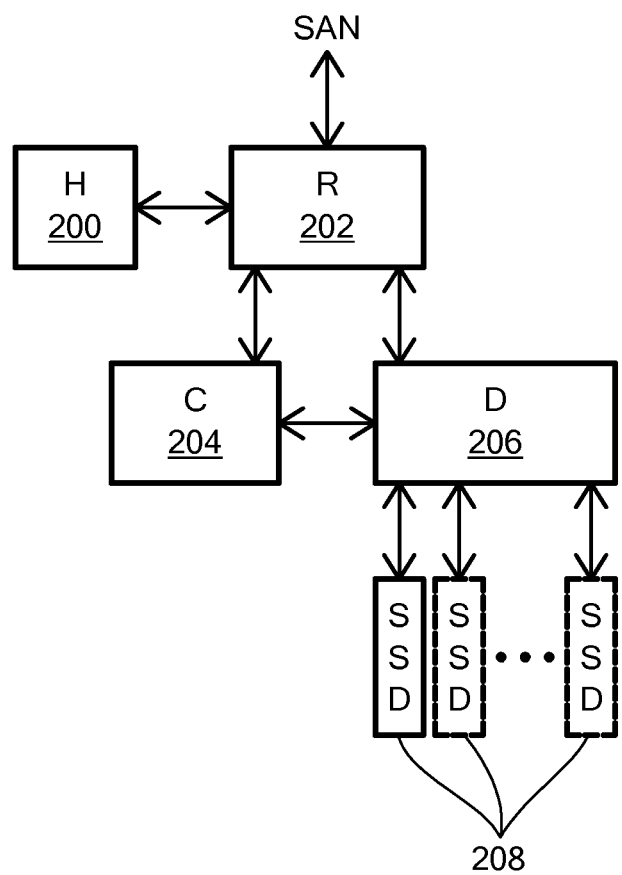
FIG. 2 shows an exemplary configuration of modules for the system of FIG. 1.

Reference is now made to FIG. 2, which is a functional block diagram of the system in which an H module 200 is connected to an R module 202. The R module is connected to both Control 204 and data 206 modules. The data module is connected to any number of memory devices SSD 208.

A function of the R Module 202 is to terminate SAN Read/Write commands and mute them to appropriate C and D Modules for execution by these Modules. By doing so, the R Module can distribute workload over multiple C and D Modules, and at the same time create complete separation of the Control and Data planes, that is to say provide separate control and data paths.

A function of the C Module 204 is to control the execution of a Read/Write command, as well as other storage functions implemented by the system. It may maintain and manage key metadata elements.

A function of the D Module 206 is to perform the actual Read/Write operation by accessing the storage devices 208 (designated SSDs) attached to it. The D module 206 may maintain metadata related with the physical location of data blocks.

A function of the H Module is to calculate the Hash function value for a given block of data.

Figure 3:
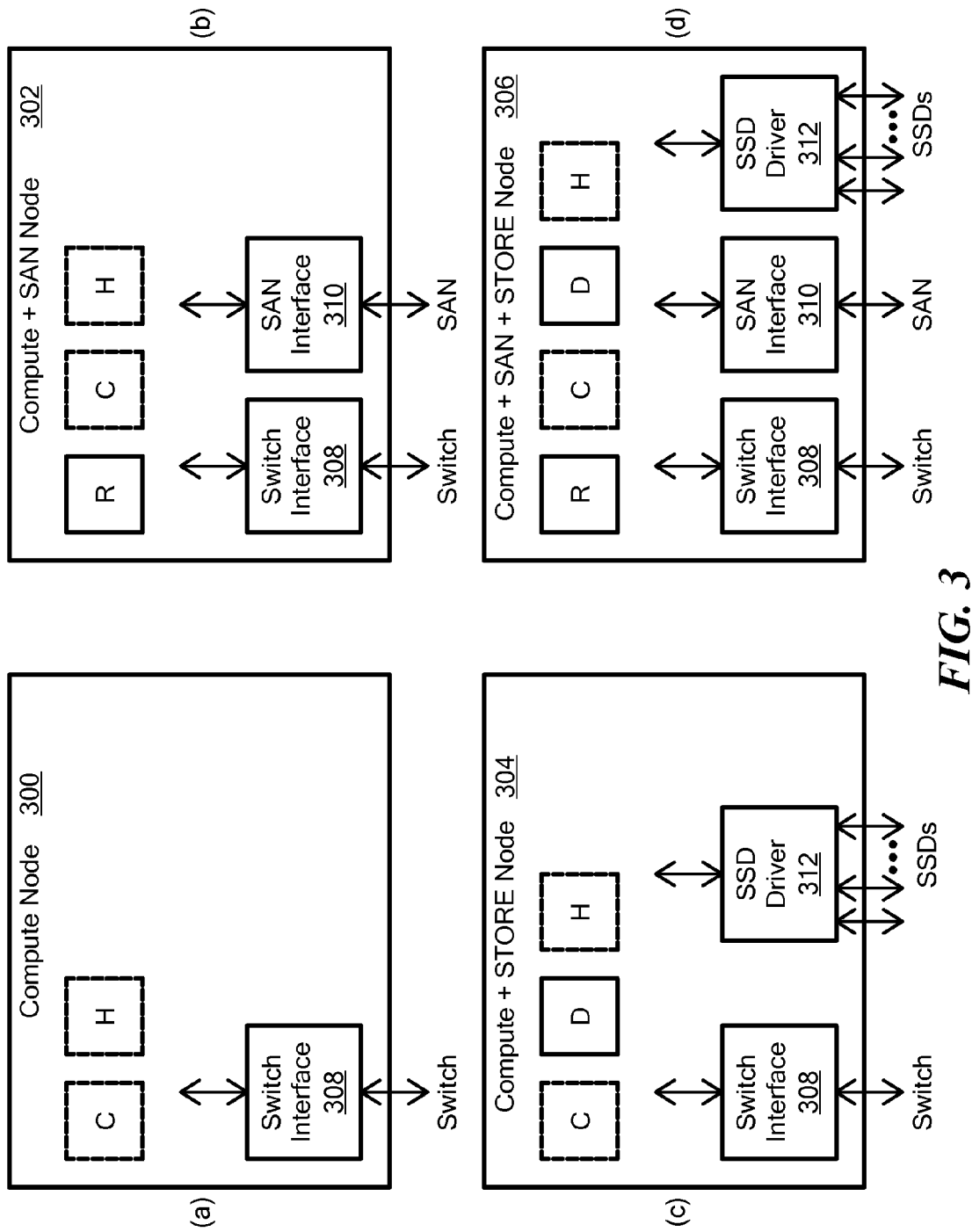
FIG. 3 is a simplified diagram schematically illustrating four different node configurations for the system.

Reference is now made to FIG. 3, which illustrates nodes. The R, C, D, and H Modules may be implemented in software, and executed on a physical Node. A system includes at least one physical Node, and may include multiple Nodes. There are four possible Node configurations: Compute Node 300, which includes control and hash modules, Compute+SAN Node 302 which includes a router as well as control and hash modules, Compute+Store Node 306, which includes a data module in addition to compute and hash modules, and a Compute+SAN+Store Node 306, which includes all four modules. A system includes a storage area networking or SAN function within at least one Node, and a Store function within at least one Node. The SAN function and the store function can be supported by the same physical Node or any combination of multiple Nodes.

In FIG. 3 each node type shows the functional Modules that execute, in at least one copy, within the Node, and functional Modules that may optionally execute within this Node. Optional Modules are shown in dashed line.

All Nodes include a switch interface 308, to allow interconnecting with a switch in a multi-Node system configuration. A Node that contains a SAN function includes at least one SAN Interface module 310 and at least one R Module. A Node that contains a Store function includes at least one SSD Driver Module 312 and at least one D Module. Hence, Compute+SAN and Compute+SAN+STORE Nodes contain a SAN Interface, to interface with the external SAN. The interface may typically use a SCSI-based protocol running on any of a number of interfaces including Fiber Channel, Ethernet, and others, through which Read/Write and other storage function commands are being sent to the system. Compute+Store and Compute+SAN+Store Nodes contain an SSD driver 312 to interface with SSDs 208 attached to that specific Node, where data is stored and accessed.

Figure 4:
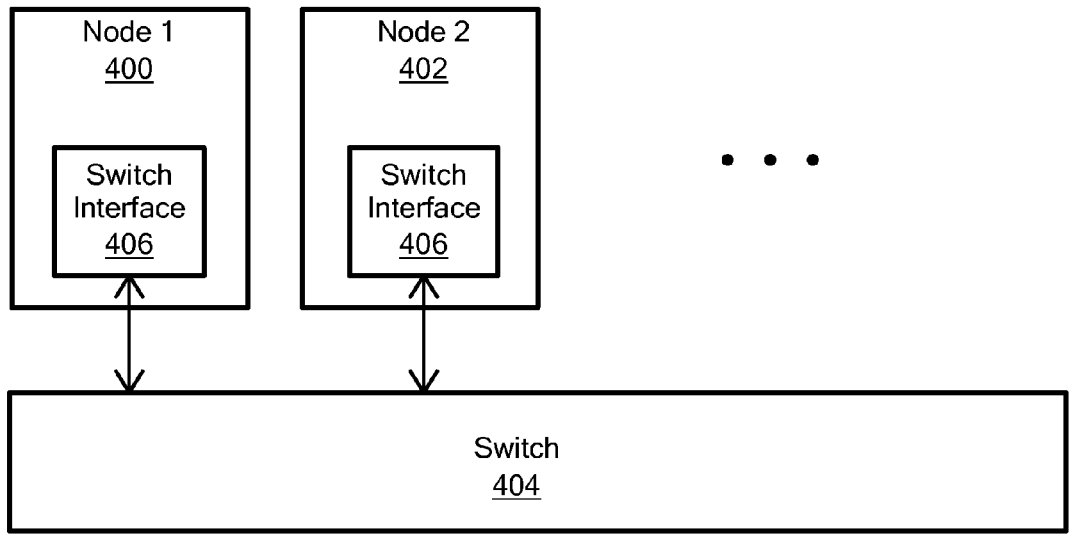
FIG. 4 is a simplified schematic diagram showing the nodes of FIG. 3 connected to a switch.

Reference is now made to FIG. 4, which shows a high level system block diagram. A system implementation includes one or more Nodes 400, 402. In all cases where a system contains more than two Nodes, all physical Nodes are interconnected by a switch 404 which may be based on any of a number of networking technologies including Ethernet, InfiniBand and so forth. In the specific case of a 2-Node system, the two Nodes can be interconnected directly without a need for a switch.

The interconnections between each Node and the Switch may include redundancy, so as to achieve high system availability with no single point of failure. In such a case, each Node may contain two or more Switch Interface modules 406, and the Switch may contain two or more ports per physical Node.

Figure 5:
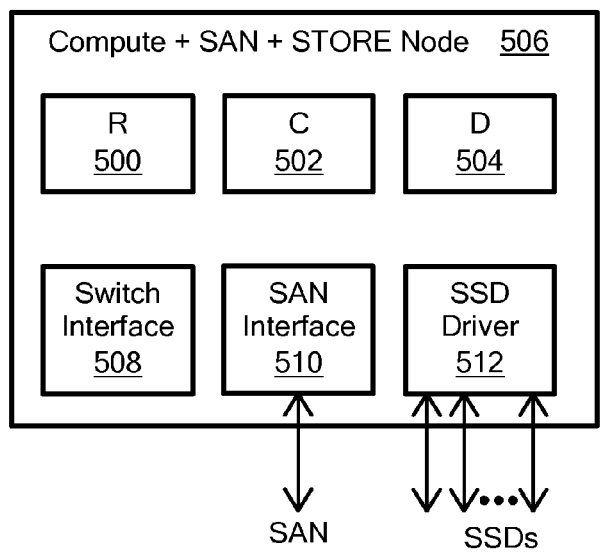
FIG. 5 is a simplified diagram showing a compute+SAN+store node for the device of FIG. 1.

As an example FIG. 5 illustrates a single Node system configuration, in which R, C and D modules, 500, 502 and 504 respectively are together in a compute+SAN+Store node 506. A switch interface 508 links to a switch. A SAN interface 510 provides an interface for storage area networking. An SSD driver 512 interfaces with the storage devices.

A four node system configuration is shown in FIG. 1 above. The configuration includes two compute and store nodes and two compute+SAN nodes.

A system that is built from multiple physical Nodes can inherently support a high availability construction, where there is no single point of failure. This means that any Node or sub-Node failure can be compensated for by redundant Nodes, having a complete copy of the system's meta-data, and a complete redundant copy of stored data (or parity information allowing recovery of stored data). The distributed and flexible architecture allows for seamless support of failure conditions by simply directing actions to alternate Nodes.

The R module is responsible for routing SCSI I/O requests to the C modules, guarantee execution and return the result; and balancing the work load between the C modules for the requests it is routing.

An A→C table indicates which C module is responsible for each logical X-page address (LXA). Each C module is responsible for a list of Sub LUNs (SLs).

The R module receives requests for I/Os from the SAN INTERFACE routes them to the designated C modules and returns the result to the SAN INTERFACE.

If an I/O operation spans across multiple SLs, and perhaps multiple C modules, then the R module has the responsibility of breaking the big I/O operation into multiple smaller independent operations according to the sub LUN unit size (SLUS). Since the atomic unit size (AUS) is never larger than the SLUS, as explained in greater detail below, each such I/O is treated as an independent operation throughout the system. The results may then be aggregated before returning to the SAN INTERFACE.

The R module is responsible for maintaining an up-to-date A→C table coordinated with the MBE. The A→C table is expected to balance the range of all possible LXAs between the available C modules.

For write operations, the R module instructs the calculation of the hash digest for each X-Page by requesting such calculation from a Hash calculation module.

The C module is responsible for: receiving an I/O request from an R module on a certain SL, guaranteeing its atomic execution and returning the result; communicating with D modules to execute the I/O requests; monitoring the disk content of its SLs' logical space by associating each LXA with its hash digest; and balancing the work load between the D modules for the SLs it is maintaining.

An H→D table maps each range of hash digests to the corresponding D module responsible for this range.

An A→H table maps each LXA that belongs to the SLs C is responsible for, to the hash digest representing the X-Page Data that currently resides in this address.

The C module receives I/O requests from R modules, distributes the work to the D modules, aggregates the results and guarantees an atomic operation. The result is returned to the R module.

The C module maintains an up-to-date H→D table coordinated with the MBE. The table is expected to balance the range of all possible hash digests between the available D modules.

The C module maintains an A→H table in a persistent way. The C module may initiate I1O requests to D modules in order to save table pages to disk, and read them from disk. To avoid frequent disk operations, a Journal of the latest table operations may be maintained.

Data is balanced between the C modules based on the logical address, at the granularity of sub-LUNs.

The D module is responsible for: maintaining a set of LUNs which are attached locally and performing all I/O operations on these LUN; managing the physical layout of the attached LUNs; managing the mapping between X-Page Data hash digests and their physical location in a persistent way; managing deduplication of X-Page Data in a persistent way; and receiving disk I/O requests from C modules, perform them and returning a result.

The D module is also responsible for, for each write operation, backing up the X-Page Data in the designated D backup module and performing read-modify operations for writes that are smaller than X-Page size (This process also involves computing a hash digest for these X-Pages).

The D module is further responsible for maintaining an up-to-date H→(D, $D_{backup}$) table coordinated with the MBE. The H→(D, $D_{backup}$) table is expected to balance the range of all possible hash digests between the available D modules.

The D module does not communicate directly with R modules. The only interaction with R modules involves RDMA read/write operations of X-Page Data.

Balancing between the D modules is based on hashing of the content.

The D module makes use of a hash digest metadata table. The hash digest metadata table maps each in use hash digest, that represents actual X-Page Data, to its meta data information including its physical page on the storage media (SSD), its memory copy (if exists), a mapping to any backup memory copy and a reference count for the purpose of deduplication.

A further structure used is the H→(D, $D_{backup}$) table. The H→(D, $D_{backup}$) table maps each range of hash digests to the corresponding D module responsible for the range as well as the $D_{backup}$ module responsible for the range.

The D modules allocate a physical page for each X-Page. The D modules also manage the memory for the physical storage. They allocate memory pages for read/write operations and perform background destaging from memory to storage media when necessary, for example, when running low on memory.

The D modules manage a separate nonvolatile memory pool (NVRAM or UPS protected) for X-Page Data backup purposes. The backup holds X-Pages that are held in memory of the D primary and have not yet been destaged. When re-balancing between D modules occur (due to a D module failure for example), the D module may communicate with other D modules in order to create new backup copies or move a primary ownership as required.

The D modules allow deduplication per X-Page Data by maintaining a persistent reference count that guarantees only one copy per X-Page Data. The D modules manage the hash digest metadata table in a persistent way. The table is coordinated with the physical layout for physical pages allocation, with the memory pointer, memory backup pointer and deduplication reference count.

The D modules receive I/O requests from C modules, perform the requests while supporting deduplication and return the result. The D modules may perform RDMA read/write operations on memory that resides in other modules, such as R modules as mentioned above, as part of the I/O operation.

When a write operation smaller than the size of an X-Page is received, the D module may read the entire X-Page to memory and perform partial X-Page modification on that memory. In this case race conditions may occur, for example when two small writes to the same X-Page occur in parallel, and the D module may be required to compute the hash digest of the resulting X-Page. This is discussed in greater detail below.

The H-Module calculates the Hash function of a given block of data, effectively mapping an input value to a unique output value. The Hash function may be based on standards based hash functions such as SHA-1 and MD5, or based on a proprietary function. The hash function is selected to generate a uniformly distributed output over the range of potential input values.

The H modules usually share nodes with an R module but more generally, the H modules can reside in certain nodes, in all nodes, together with R modules, or together with C or D modules.

The following discussion provides high level I/O flows for read, write and trim.

Throughout these flows, unless noted otherwise, control commands are passed between modules using standard RPC messaging, while data "pull" operations may use RDMA read. Data push (as well as Journal) operations may use RDMA write.

The read flow of one X-Page may consist of one R module which receives the read request from the application, one C module in charge of the address requested and one D module which holds the X-Page to be read. Larger, or unaligned, requests may span several X-Pages and thus may involve several D modules. These requests may also span several SLs, in which case they may involve several C modules as well.

Figure 6:
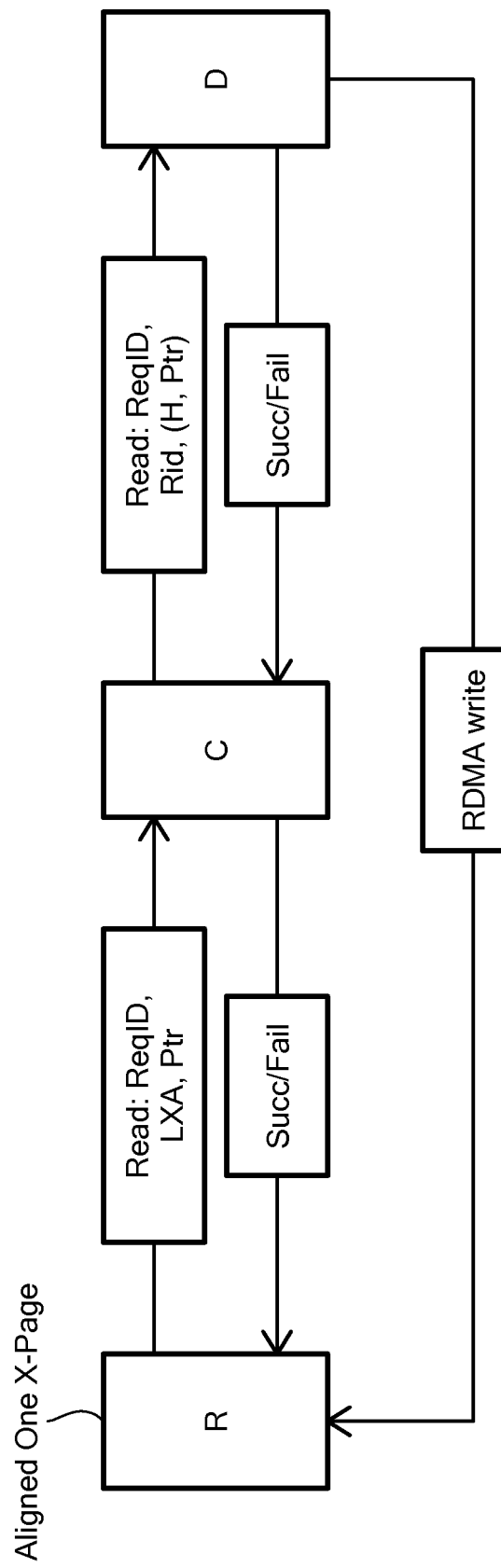
FIG. 6 is a simplified flow chart which illustrates the flow for a read operation for one aligned X-page.

Reference is now made to FIG. 6 which illustrates the flow for a read operation for one aligned X-page. When the R module receives a read request from an application the R module allocates a request ID for the operation; translates the LBA to LXA; allocates a buffer for the data to be read; consults the A→C component to determine which C module is in charge of this LXA; and sends the designated C module a read request which includes parameters that include a request ID; an LXA; and a pointer to the allocated buffer.

The C module, when receiving the request, consults the A→H component, from which it obtains a hash digest representing the X-Page to be read; consults the H→D component to determine which D module holds the X-Page in question; and sends this D module a read request which includes parameters that include a request ID (as received from the R module), the hash digest, a pointer to the buffer to read to, as received from the R module; and an identifier of the R module.

The D module, when receiving the request, reads the data of the requested X-Page from SSD and performs an RDMA write to the requesting R module, specifically to the pointer passed to it by the C module.

Finally the D module returns success or error to the requesting C module.

The C module in turn propagates success or error back to the requesting R module, which may then propagate it further to answer the application.

Figure 7:
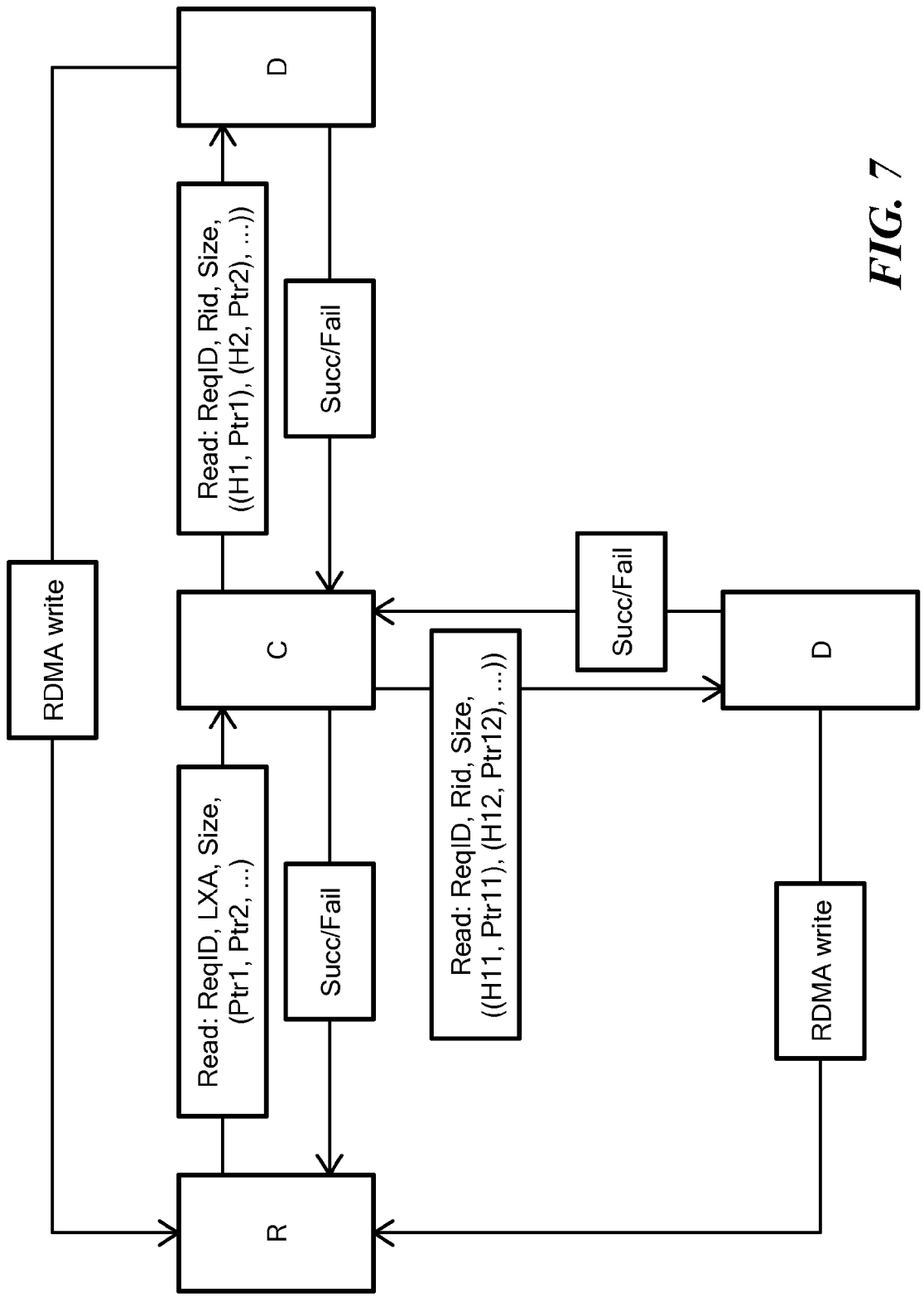
FIG. 7 is a simplified flow chart which illustrates the flow in the event that a read request arrives for a range of addresses spanning more than one X-Page but only one SL.

Reference is now made to FIG. 7, which illustrates the flow in the case that a read request arrives for a range of addresses spanning more than one X-Page but only one SL. In such a case the R module sends the designated C module a read command with the parameters that include a request ID, first LXA, size of the requested read in X-Pages-n, and n pointers to the allocated X-Page buffers.

The rest of the R module's treatment is identical to the aligned one X-Page scenario previously described herein.

The C module, when receiving the request divides the logical address space to LXAs. For each LXA the C module consults the A→H component to determine the corresponding hash digest; consults the H→D table to determine which D module is responsible for the current LXA; sends each D module a read command containing all the hashes that the respective D module is responsible for. The parameters of the read command include a request ID (as received from the R module); a list of respective hash-pointer pairs; and the identifier of the R module.

Each D module, when receiving the request, acts per hash-pointer pair in the same manner as described above for one X-Page. Aggregated success or error is then sent to the requesting C module.

The C module aggregates all the results given to it by the D modules and return success or error back to the requesting R module, which may then answer the application.

In the case that a read request spans multiple SLs, the R module splits the request and sends several C modules read requests. Each C module may receive one request per SL. The flow may continue as in the simpler case above, except that now the R module aggregates the responses before it answers the application.

Read requests smaller than 4 KB, as well as requests not aligned to 4 KB, may be dealt with at the R module level. For each such parcel of data, the R module may request to read the encompassing X-Page. Upon successful completion of the read command, the R module may crop the non-relevant sections and return only the requested data to the application.

The write flow of one X-Page may consist of one R module which receives the write request from the application, one C module in charge of the address requested and three D modules: $D_{target}$ which is in charge of the X-Page Data to be written (according to its appropriate hash digest), $D_{old}$ which was in charge of the X-Page Data this address contained previously ("old" hash digest), and $D_{backup}$ in charge of storing a backup copy of the X-Page Data to be written.

Figure 8:
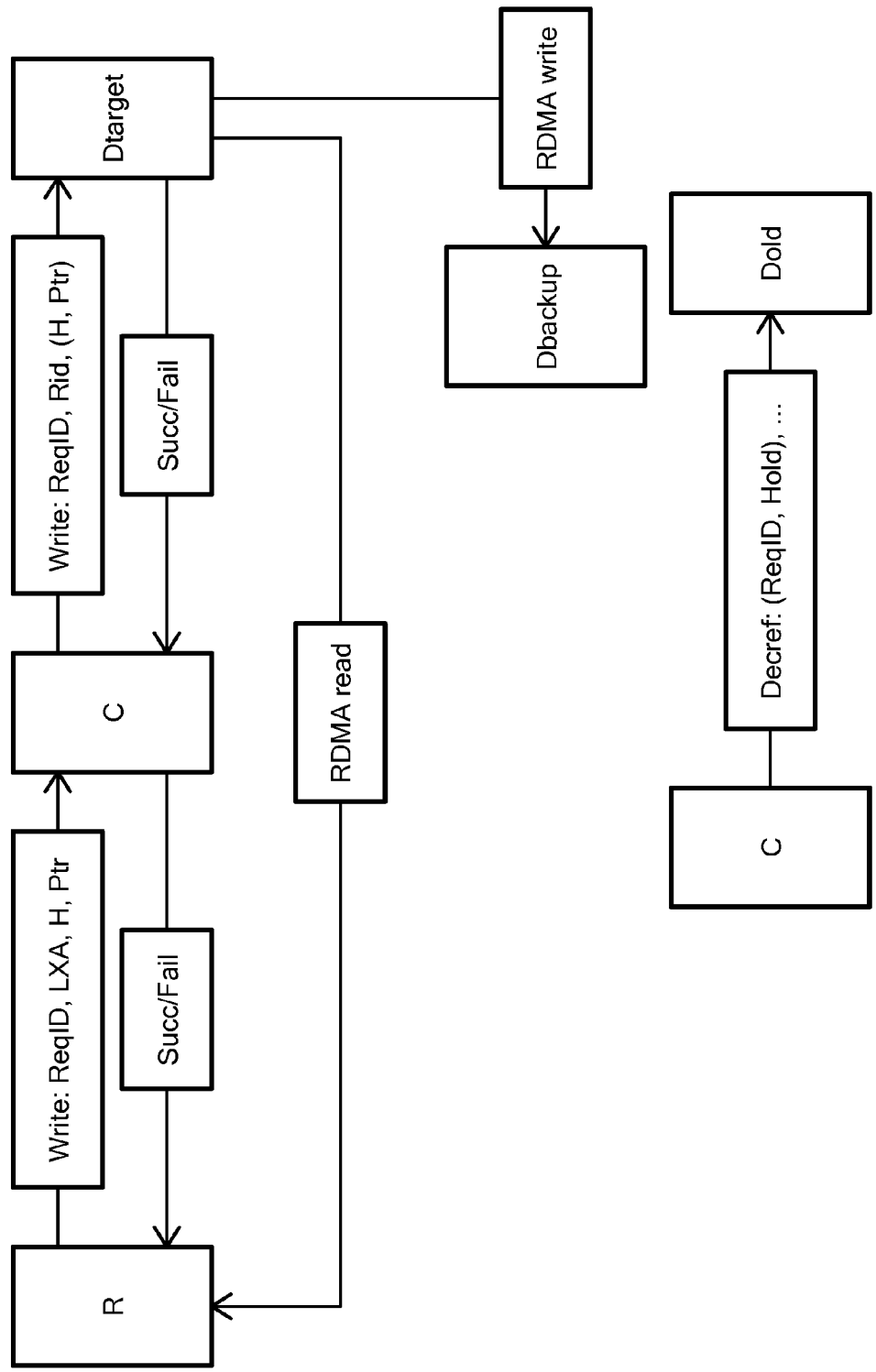
FIG. 8 is a simplified flow diagram illustrating the write procedure for a single aligned X page.

Reference is now made to FIG. 8, which is a simplified flow diagram illustrating the write procedure for a single aligned X page according to the examples described herein.

When an R module receives a write request from the application, the R module allocates a request ID for this operation; translates the LBA to an LXA; computes a hash digest on the data to be written; consults its A→C component to determine which C module is in charge of the current LXA; and sends the designated C module a write command with parameters that include a request ID; an LXA; a hash digest; and a pointer to the buffer containing the data to be written.

The C module, when receiving the request consults its H→D component to understand which D module is in charge of the X-Page to be written ($D_{target}$); and sends $D_{target}$ a write request with parameters that include the request ID (as received from the R module); the hash digest (as received from the R module); the pointer to the data to write (as received from the R module); and the identifier of the R module.

The D module receiving the write command, $D_{target}$, may first check if it already holds an X-Page corresponding to this hash. There are two options here:

First, $D_{target}$ does not have the X-Page. In this case $D_{target}$ fetches the data from the R module using RDMA read and stores it in its memory; consults the H→D component to determine which D module is in charge of storing a backup copy of this X-Page ($D_{backup}$); performs an RDMA write of the X-Page Data to the $D_{backup}$ backup memory space; and returns success (or failure) to the C module.

Second, $D_{target}$ has the X-Page. In this case $D_{target}$ increases the reference count, returns success (or failure) to the C module.

The C module waits for a response from $D_{target}$. If a success is returned, the C module updates the A→H table to indicate that the LXA in question should point to the new hash and returns a response to the requesting R module.

If this is not a new entry in the A→H table, the C module asynchronously sends a decrease reference count command to $D_{old}$ (the D module responsible for the hash digest of the previous X-Page Data). These commands may be aggregated at the C module and sent to the D modules in batches.

The R module may answer the application once it receives a response from the C module.

Figure 9:
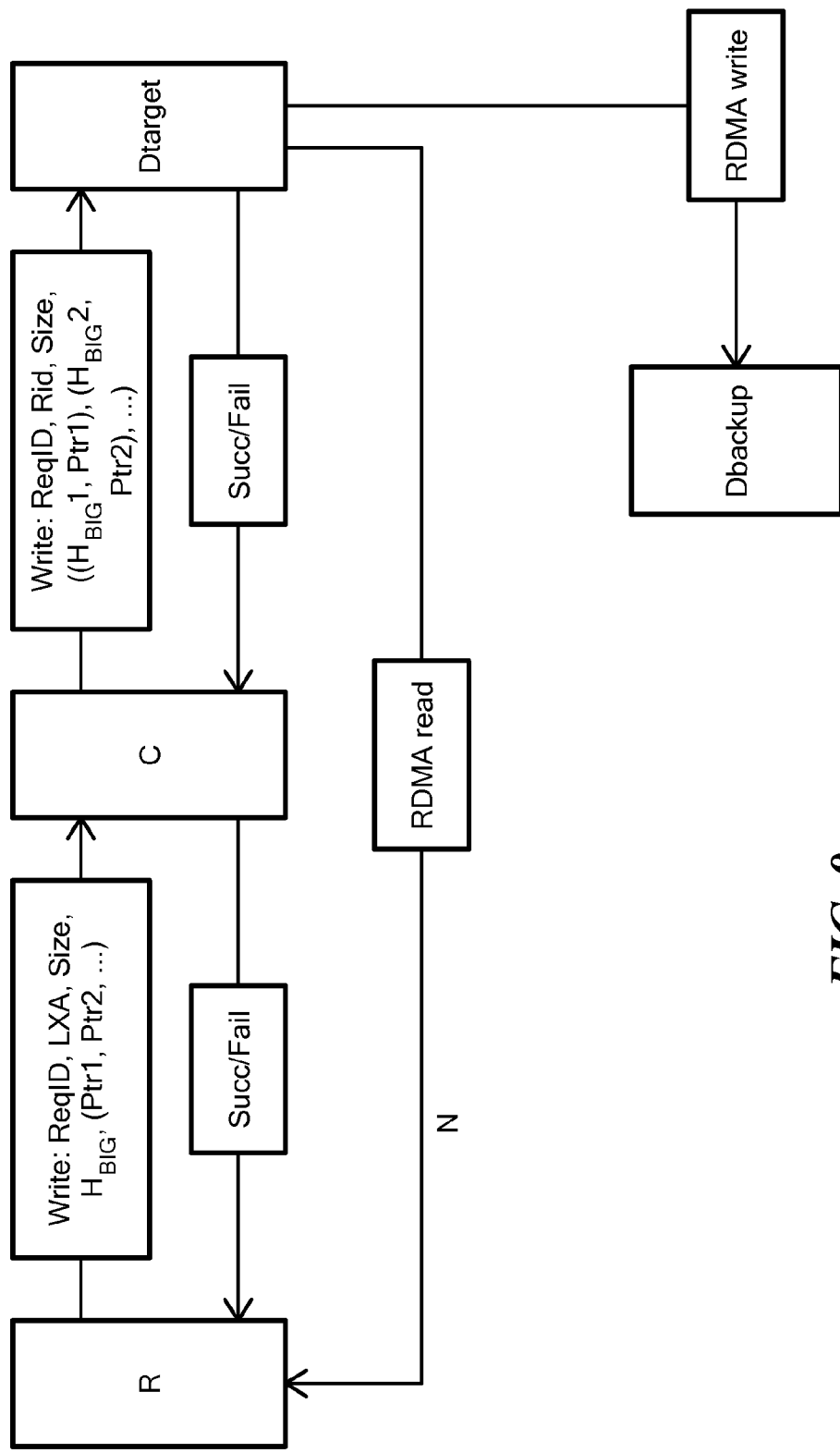
FIG. 9 is a simplified flow diagram illustrating the process for performing write operations to multiple full X-Pages.

Reference is now made to FIG. 9, which is a flow diagram illustrating the process for writes to multiple full X-Pages.

In the case that the write request spans a range of addresses which include more than one X-Page but only one SL, the R module sends the designated C module a write command with parameters that include a request ID; a first LXA; a size of the requested write in LXAs-n; and $H_{BIG}$ which is a unique identifier of the entire chunk of data to be written. Her may be a computed hash digest and thus equal for two identical chunks of data.

Additional parameters sent with the write command are n pointers that point to the buffers which hold the data to be written.

The rest of the R module treatment is the same as for the aligned one X-Page scenario.

The C module, when receiving the request, consults its H→D component to understand which D module is in charge of $H_{BIG}(D_{target})$ and generates a hash digest per pointer by replacing one byte of $H_{BIG}$ with the offset of that pointer. It is noted that this byte must not collide with the bytes used by the H→D table distribution.

It may send D a write request with the parameters that include the request ID (as received from the R module); a list of respective hash-pointer pairs; and the Identifier of the R module.

The D module, when receiving the request, acts per hash-pointer pair in the same manner as described above for one X-Page. Aggregated success or error is then sent to the requesting C module.

The C module waits for a response from $D_{target}$. If the response indicates success, the C module updates its A→H table to indicate that the LXAs in question should point to the new hashes. Updating of entries in the A→H table may be done as an atomic operation, to ensure the write request is atomic. Note that all requests aligned to 4 KB (or another predefined block size) that fall within a SL may be atomic. The C module returns a response to the requesting R module. The C module adds the list of old hashes to the "decrease reference" batch if needed.

The R module answers the application once it receives a response from the C module.

In the case in which a write request spans multiple SLs, the R module splits the request and sends smaller write requests to several C modules. Each C module receives one request per SL (with a unique request ID). The flow continues as in the simpler case above, except that now the R module aggregates the responses before it answers the application.

Figure 10:
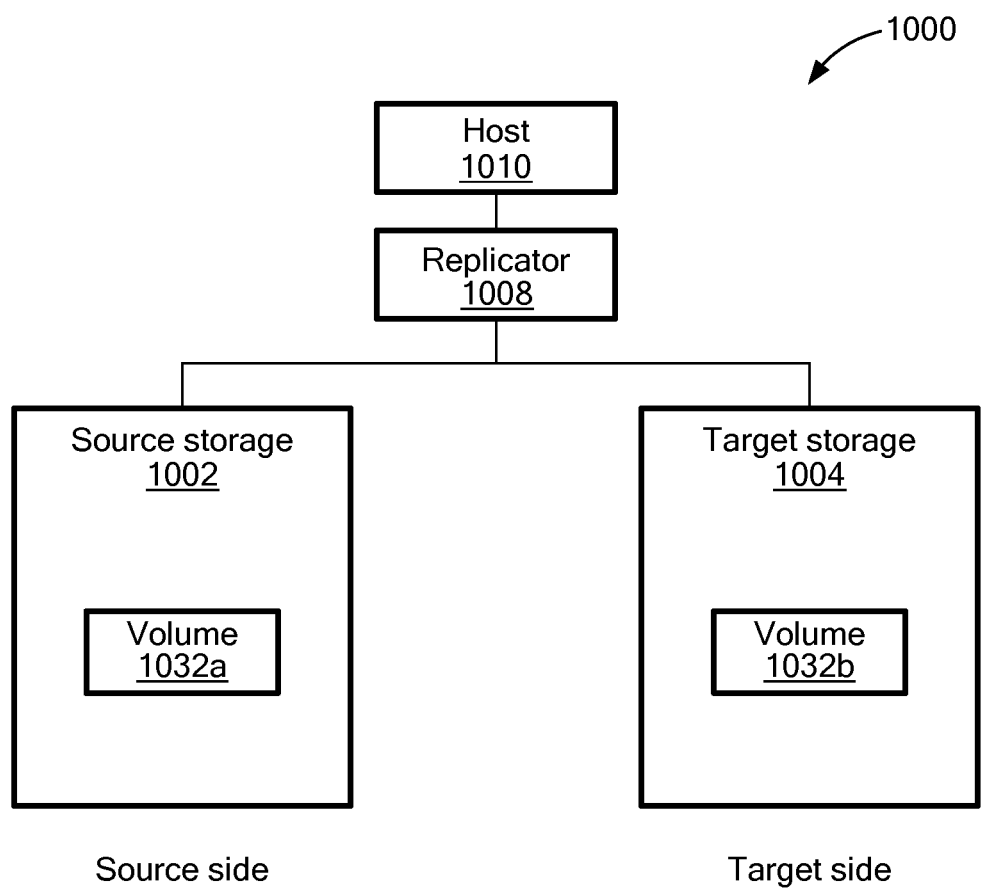
FIG. 10 is a simplified block diagram of an example of a replication system.

Referring to FIG. 10, a replication system 1000 may be implemented using the system 10. The replications system 1000 includes a source storage (e.g., a storage array) 1002 (on a source side), a target storage (e.g., a storage array) 1004 (on a target side), a replicator 1008 and a host 1010. The host 1010 may include an application (not shown) that writes to the source storage 1002. The replicator 1008 ensures that all the writes made to the source storage 1002 are also eventually made to the target storage 1004.

The source storage 1002 includes a volume 1032a and the target storage includes a volume 1032b. In one example, the volume 1032a is asynchronously replicated to the volume 1032b.

Figure 11:
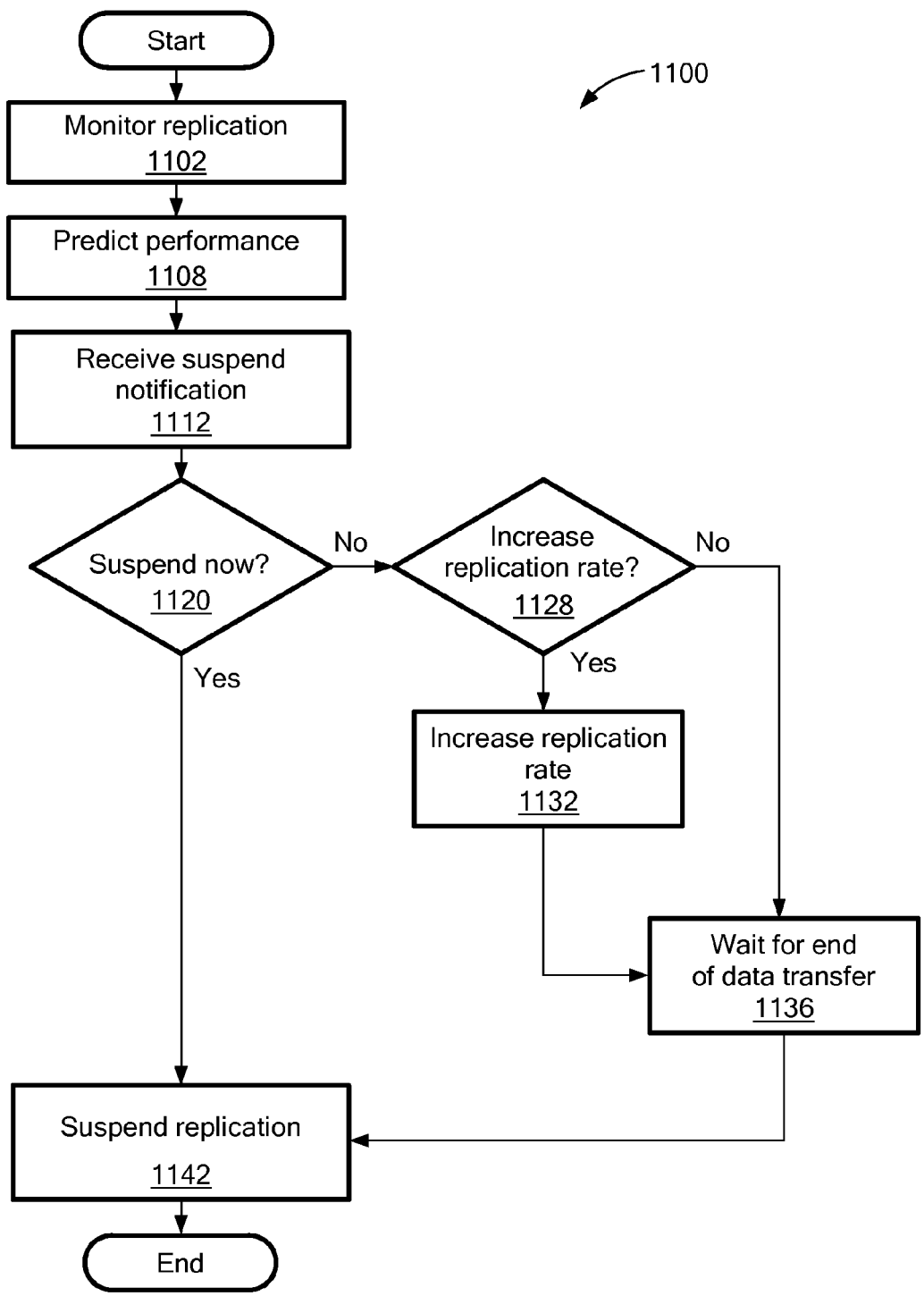
FIG. 11 is a simplified flowchart of an example of a process to suspend data replication.

Referring to FIG. 11, an example of a process to suspend data replication is a process 1100. Process 1100 is not strictly a soft suspend or strictly a hard suspend. A soft suspend waits for current data transfer cycle to complete and pauses scheduling of future data transfer. A hard suspend aborts ongoing data transfer, and restarts data transfer from the beginning upon resume. A soft suspend preserves data transfer work already done, however it takes an undetermined and an unbounded amount of time to reach the suspended state. A hard suspend has the benefit of reaching suspended state immediately, but at the cost of wasting all the data already transferred, which is especially costly when a suspend request comes near the end of a replication cycle. A replication cycle is a complete delta data transfer from source to destination. Upon successful completion of a replication cycle, the replication destination is synchronized with the data content of the source at the beginning of the cycle. A replication cycle may include one or more of the following actions: start a new cycle if the system is ready, previous cycle complete, RPO/lag criteria met, resource available for replication, and so forth; generate a snapshot against the source, $S_{src}$, which is the base of current cycle; generate a snapshot against the target, $S_{tgt}$, which will be the container of the cycle data transfer; scan and compute the difference between current cycle snap and previous cycle snap, and transfer data different to target, complete the replication cycle after the entire source snap data been scanned, and data transfer completed (e.g., at this point, the data content of $S_{tgt}$ is the same as $S_{src}$); and preparation for the next replication cycle.

On the other hand, process 1100 allows a system to dynamically decide the best suspend action based on, for example, customer priorities, a current condition of the system, ongoing replication progress and combinations thereof.

Process 1100 monitors replication (1102). For example, the process 1100 monitors progress of a replication data transfer by collecting and aggregating replication iteration I/O statistics from worker threads in nodes. The I/O statistics collected during a replication cycle include but are not limited to, how much data has been scanned and transferred, where is the current scan iterator in the address space, how much time elapsed since start of the cycle, and so forth. A worker thread is a thread which is assigned a subset of scanning and transfer work of the replication cycle. In some examples, a replication cycle may launch multiple worker threads, each of which scans a subset of data.

Process 1100 predicts performance (1108). For example, process 1100 predicts an estimated time to complete a current replication cycle based on progress, short term/long term history of cycle progressing rate, an individual worker thread/node progress rate or any combination thereof.

Process 1100 receives a suspend notifications (1112). For example, a user sends a suspend command to the system 1100. In other examples, certain conditions such as other commands being executed or event triggers require that replication be suspended. For example, suspend may be triggered by a resource contention, or link deterioration.

Process 1100 determines whether to suspend the replication data transfer (1120). For example, process 1100 uses the predicted performance to determine whether to suspend now or wait based in the predicted performance determined in processing block 1112. For example, process 1100 dynamically determines a suspend deadline based on cycle completion prediction, user case scenarios, the condition of the system or any combination thereof. In one particular example, if the replication system 1000 system enters a degraded state and would like to suspend non-essential I/O activity such as replication, suspend deadline will be immediate; or if the replication source site encounters a disaster, suspend deadline will also be set to immediate so that the system could quickly prepare for failover. On the other hand, in other examples, if a system administrator needs to upgrade the system in a certain maintenance window, the suspend deadline could be based on the maintenance window size and cycle completion prediction. A maintenance window is period of time designated in advance by the technical staff, during which preventive maintenance that could cause disruption of service may be performed. Process 1100 provides an optimal solution for both responsiveness and efficiency with minimal administrative burden.

If the process 1100 determines to suspend now, process 1100 suspends replication (1142). For example, the system 1000 aborts current data transfer, and enters a suspended state once abort is complete.

If the process 1100 determines that suspend does not need to occur immediately, process 1100 determines if the replication rate should be increased (1128). If the replication rate should be increased, process 1100 increases the replication rate (1132). For example, if a certain use case requires both to preserve data transfer and a fast suspend, process 1100 may determine to increase replication bandwidth and replication I/O priority to speed up data transfer, so that the estimated time to complete falls within a desired deadline.

If the replication rate should not be increased (i.e., the predicted cycle complete time (e.g., even after a replication rate adjustment) is well within suspend deadline), process 1100 waits for the end of the data transfer (1136). For example, if estimated time to complete a data transfer cycle is well within a suspend deadline, the system 1000 marks replication for suspension and waits for current cycle completion, and then switches into suspended state (e.g., processing block 1142).

Figure 12:
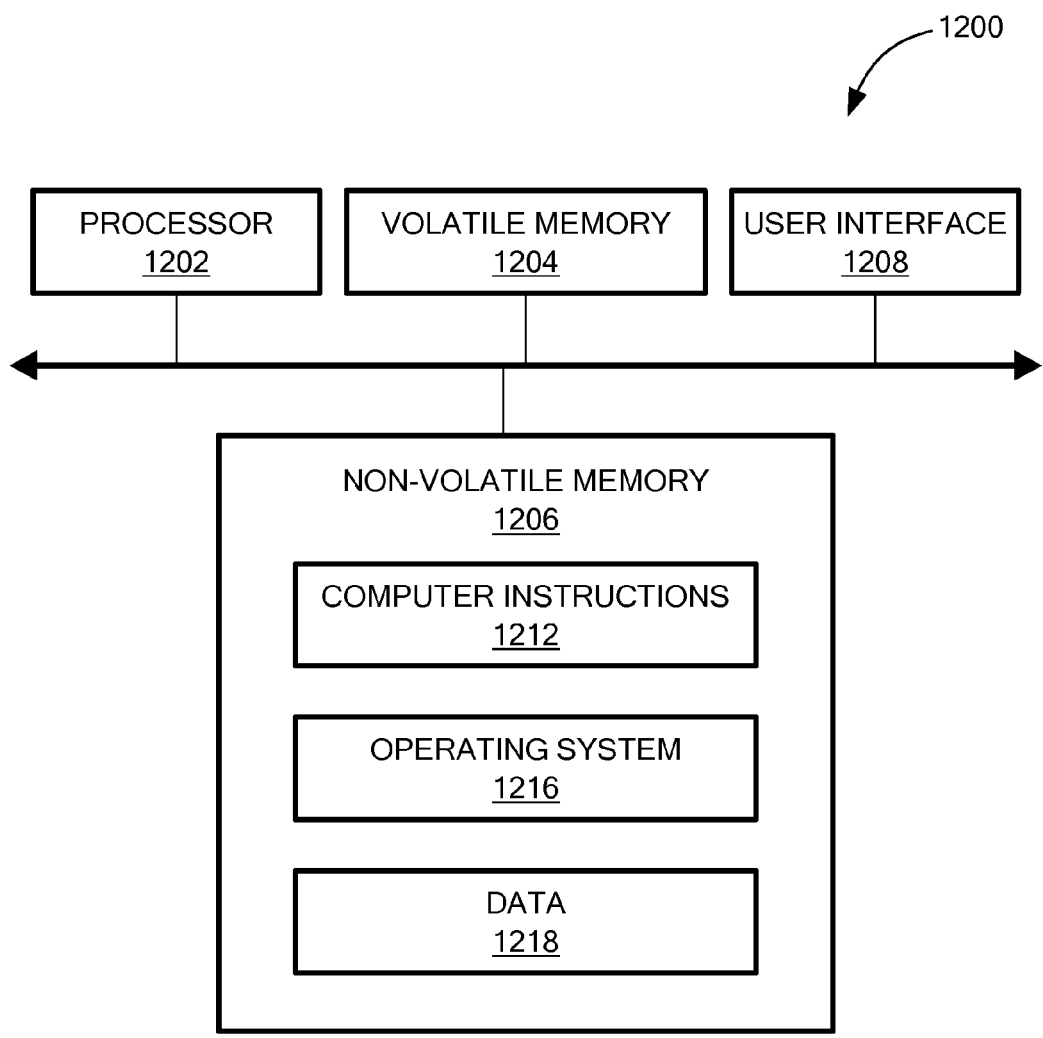
FIG. 12 is a computer on which all or part of the process of FIG. 11 may be implemented.

Referring to FIG. 12, in one example, a computer 1200 includes a processor 1202, a volatile memory 1204, a non-volatile memory 1206 (e.g., hard disk) and the user interface (UI) 1208 (e.g., a graphical user interface, a mouse, a keyboard, a display, touch screen and so forth). The non-volatile memory 1206 stores computer instructions 1212, an operating system 1216 and data 1218. In one example, the computer instructions 1212 are executed by the processor 1202 out of volatile memory 1204 to perform all or part of the processes described herein (e.g., process 1100).

The processes described herein (e.g., process 1100) are not limited to use with the hardware and software of FIG. 12; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 1100 is not limited to the specific processing order of FIG. 11. Rather, any of the processing blocks of FIG. 11 may be re-ordered, combined or removed, performed in parallel or in serial, as necessary, to achieve the results set forth above.

The processing blocks (for example, in the process 1100) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
   monitoring a replication process;
   predicting performance based on the monitoring;
   receiving a suspend notification; and
   determining whether to suspend the replication process or wait to suspend the replication process based on the performance predicted.

2. The method of claim 1, wherein determining whether to suspend the replication process or wait to suspend the replication process based on the performance predicted comprises determining whether the data replication will complete before a suspend deadline.

3. The method of claim 2, further comprising increasing the replication rate so that the data replication will complete before the suspend deadline.

4. The method of claim 1, wherein monitoring a replication process comprises monitoring progress of a replication data transfer by collecting and aggregating replication iteration I/O statistics from worker threads in nodes.

5. The method of claim 1, wherein predicting performance based on the monitoring comprises predicting an estimated time to complete a current replication cycle based on at least one of progress, short term/long term history of cycle progressing rate, and individual worker thread/node progress rate.

6. The method of claim 1, wherein determining whether to suspend the replication process or wait to suspend the replication process based on the performance predicted comprises determining a suspend deadline based on at least one of a cycle completion prediction, user case scenario, a condition of a replication system or a maintenance window size.

7. An apparatus, comprising:
   electronic hardware circuitry configured to:
   monitor a replication process;
   predict performance based on the monitoring;
   receive a suspend notification; and
   determine whether to suspend the replication process or wait to suspend the replication process based on the performance predicted.

8. The apparatus of claim 7, wherein the circuitry comprises at least one of a processor, a memory, a programmable logic device or a logic gate.

9. The apparatus of claim 7, wherein the circuitry configured to determine whether to suspend the replication process or wait to suspend the replication process based on the performance predicted comprises circuitry configured to determine whether the data replication will complete before a suspend deadline.

10. The apparatus of claim 9, further comprising circuitry configured to increase the replication rate so that the data replication will complete before the suspend deadline.

11. The apparatus of claim 7, wherein the circuitry configured to monitor a replication process comprises circuitry configured to monitor progress of a replication data transfer by collecting and aggregating replication iteration I/O statistics from worker threads in nodes.

12. The apparatus of claim 7, wherein circuitry configured to predict performance based on the monitoring comprises circuitry configured to predict an estimated time to complete a current replication cycle based on at least one of progress, short term/long term history of cycle progressing rate, and individual worker thread/node progress rate.

13. The apparatus of claim 7, wherein circuitry configured to determine whether to suspend the replication process or wait to suspend the replication process based on the performance predicted comprises circuitry configured to determine a suspend deadline based on at least one of a cycle completion prediction, user case scenario, a condition of a replication system or a maintenance window size.

14. An article comprising:
   a non-transitory computer-readable medium that stores computer-executable instructions, the instructions causing a machine to:
   monitor a replication process;
   predict performance based on the monitoring;
   receive a suspend notification; and
   determine whether to suspend the replication process or wait to suspend the replication process based on the performance predicted.

15. The article of claim 14, wherein the instructions causing the machine to determine whether to suspend the replication process or wait to suspend the replication process based on the performance predicted comprises instructions causing the machine to determine whether the data replication will complete before a suspend deadline.

16. The article of claim 15, further comprising instructions causing the machine to increase the replication rate so that the data replication will complete before the suspend deadline.

17. The article of claim 14, wherein the instructions causing the machine to monitor a replication process comprises instructions causing the machine to monitor progress of a replication data transfer by collecting and aggregating replication iteration I/O statistics from worker threads in nodes.

18. The article of claim 14, wherein instructions causing the machine to predict performance based on the monitoring comprises instructions causing the machine to predict an estimated time to complete a current replication cycle based on at least one of progress, short term/long term history of cycle progressing rate, and individual worker thread/node progress rate.

19. The article of claim 14, wherein instructions causing the machine to determine whether to suspend the replication process or wait to suspend the replication process based on the performance predicted comprises instructions causing the machine to determine a suspend deadline based on at least one of a cycle completion prediction, user case scenario, a condition of a replication system or a maintenance window size.

* * * * *